(12) United States Patent
Shipley

(10) Patent No.: US 6,406,678 B1
(45) Date of Patent: Jun. 18, 2002

(54) PROCESS FOR PRODUCTION OF HIGH PURITY AMORPHOUS SILICA FROM BIOGENIC MATERIAL

(75) Inventor: Larry W. Shipley, Lake Charles, LA (US)

(73) Assignee: Process Management, Inc., Lake Charles, LA (US)

( * ) Notice: Subject to any disclaimer, the term of this patent is extended or adjusted under 35 U.S.C. 154(b) by 0 days.

(21) Appl. No.: 09/817,519

(22) Filed: Mar. 26, 2001

(51) Int. Cl.$^7$ .............................. C01B 33/12; F23G 5/00
(52) U.S. Cl. ........................................ 423/335; 110/346
(58) Field of Search ......................... 423/335; 110/235, 110/346; 106/475

(56) References Cited

U.S. PATENT DOCUMENTS

| | | | | |
|---|---|---|---|---|
| 1,293,008 A | * | 2/1919 | Blardone | 423/332 |
| 3,125,043 A | * | 3/1964 | Gravel | 106/705 |
| 3,959,007 A | * | 5/1976 | Pitt | 106/406 |
| 4,105,459 A | * | 8/1978 | Mehta | 106/717 |
| 4,214,920 A | * | 7/1980 | Amick et al. | 106/475 |
| 4,274,344 A | * | 6/1981 | Nider | 110/244 |
| 5,503,931 A | * | 4/1996 | Goodman, Sr. | 106/605 |
| 5,833,940 A | * | 11/1998 | Reiber et al. | 106/600 |

FOREIGN PATENT DOCUMENTS

| | | | |
|---|---|---|---|
| DE | 259526 | * | 3/1977 |
| JP | 52136892 | * | 11/1977 |
| JP | 08048515 | * | 2/1996 |

OTHER PUBLICATIONS

English abstract of CN 1063087, Jul. 1992.*
English abstract of CN 1073660, Jun. 1993.*

* cited by examiner

*Primary Examiner*—Ngoc-Yen Nguyen
(74) *Attorney, Agent, or Firm*—Joseph L. Lemoine, Jr.

(57) ABSTRACT

The process for process for production of high purity amorphous silica from biogenic matter having a content of amorphous silica, particularly rice hulls, is characterized by use of a solution having an oxidizing solute to reduce the long-chain organic compounds of the biogenic matter prior to volatile removal of the organic compounds by heated oxidation. Prior to reduction of the hydrocarbons the biogenic matter may be finely divided, screened, subjected to surfactant wash, rinsed and soaked in water to accelerate and enhance penetration of the oxidizing solution. Following removal of the volatile impurities by heated oxidation the remaining silica may be rinsed with water, acid solution or other solutions to remove even trace impurities. At the end of the process herein disclosed a fine white amorphous silica of extreme purity can be produced.

27 Claims, No Drawings

PROCESS FOR PRODUCTION OF HIGH PURITY AMORPHOUS SILICA FROM BIOGENIC MATERIAL

BACKGROUND OF THE INVENTION

1. Field of the Invention

Silica, while abundant in many natural sources, is rarely found there in a highly pure amorphous form. Rather when found in natural sources of inorganic origin, it is typically of crystalline form and contains inorganic impurities. Conversely, when found in biogenic matter, the silica is amorphous but typically contains organic impurities, including various hydrocarbons. The invention disclosed and claimed herein relates to a process for recovery of highly pure amorphous silica from biogenic materials, particularly rice hulls, which are rich in amorphous silica content.

2. Description of Related Art

Means have been described for the product of amorphous silica from inorganic materials, but such means are expensive, hazardous, consume substantial energy and involves polluting chemicals. In general, such means involves a high temperature reacting finely divided inorganic source material with a strong halogen, such as chlorine or fluorine, to create silicon halides such as silicon tetrachloride or silicon tetrafluoride, and subsequently oxidizing the halide to recover silica.

Means have also been described for recovery of silica from biogenic source material, in particular rice hulls. U.S. Pat. No. 3,125,043 to Gravel describes one such process. In Gravel a bed of rice hulls is subjected to up-flow of air at elevated temperature (between approximately 500–800° C.). The resulting ash is constituted of amorphous silica which still contains from 2–10% impurities, which remains far too impure for many uses. While not stated in Gravel, applicant's own experience suggests that the remaining impurities are primarily composed of a carbonaceous residue which cannot readily be made volatile by oxidation, because as Gravel states, a somewhat increased temperature merely tends to cause the impurities to be included within the silica particles. While the carbonaceous residue might be oxidized by a substantially higher temperature, such temperature would cause the resulting silica to be of crystalline rather than amorphous form.

Another attempt to produce silica from biogenic sources, to produce silicon, is seen in U.S. Pat. No. 4,214,920 to Amick et al. There rice hull ash is first treated with strong mineral acid and then coked (subjected to elevated temperature in a non-oxidizing environment). The result is a black, non-agglomerating form of silica having substantial amounts of carbon as an impurity. To produce silicon from such material, high purity silica must be added and the mixture thermally reduced to silicon at a temperature of about 1400° C.

Another way to extract silica from biogenic sources is illustrated in Chinese Pat. No. 1063087 to Xianhe Yang. There rice hulls or rice hull ash is placed in a pressure containing vessel where they are subjected to strong concentrations of nitric acid and hydrogen peroxide at elevated temperature. The resulting residue is washed, to neutral pH, with de-ionized water, to remove remaining chemical residue.

Yet another way to extract silica from biogenic material, such as rice hulls, is demonstrated in U.S. Pat. Nos. 1,293,008 and 5,833,940. In these patents rice hulls or ash thereof is reacted with carbonates or hydroxides of alkali metal, such as sodium or potassium, to form a soluble silicate solution, from which silica may be subsequently precipitated.

Each of the above described methods produce amorphous silica which has substantial quantities of impurities, particularly carbon-based compounds and involves substantial expense and use of substantial quantities of hazardous chemicals, or both. As a result of the undesirable characteristics of processes to extract silica from biogenic materials containing silica, such as rice hulls, have traditionally been considered to be a waste product, of little or no utility. Large quantities cannot be left to rot near milling facilities. They are too bulky to transport and dispose economically at designated disposal sites. Several jurisdictions prohibit open burning of such materials. Only limited attempt has been made to burn such materials for power generation, since the combustion by-products tend to be abrasive. The invention described and claimed herein addresses these issues by providing an economical, energy efficient process to convert what is presently considered a waste disposal problem to highly valuable amorphous silica of very high purity.

SUMMARY OF THE INVENTION

The process herein described and claimed is principally characterized by two steps, soaking a biogenic material which contains a recoverable amount amorphous silica, particularly rice hulls, in a solution containing an oxidizing agent, such as hydrogen peroxide or peracetic acid for an effective length of time at an effective temperature and then burning the hulls at an elevated temperature (above approximately 500° C., but substantially below the melting point of silica). While no claim is made of the precise manner or effect in which soaking a biogenic source material with oxidizing solution reacts with the particular molecules of said material, it is believed that such step causes the oxidizing agent to act as "chemical scissors", which "cut" long hydrocarbon molecules of the biogenic material, such as lignin and cellulose, into shorter, more volatile molecules, which are subsequently consumed (driven off as heated gases) during the step of burning, Following the step of burning non-oxidized impurities (which are typically comprised of small amounts of non-volatile, inorganic minerals, such as various magnesium and calcium compounds) which remain with the silica may then be substantially removed from the amorphous silica by rinsing with water, mild acid solutions. Prior to the step of soaking the biogenic material in an oxidizing solution, it may be cleaned by screening and washing, and/or softened by pre-soaking in liquid, which may be of elevated temperature.

DESCRIPTION OF THE PREFERRED EMBODIMENT OF THE INVENTION

While the present invention will be described with reference to preferred embodiments, it will be understood by those skilled in the art that various changes may be made and equivalents may be substituted for elements thereof without departing from the scope of the invention. In addition, modifications may be made to adapt a particular situation or material to the teachings of the invention without departing from the essential scope thereof. It is therefore intended that the present invention not be limited to the particular embodiments disclosed herein, but that the invention will include all embodiments (and legal equivalents thereof falling within the scope of the appended claims.

The preferred biogenic material from which highly pure silica may be derived by the process herein disclosed is rice hulls. While the amount of silica contained in rice hulls may vary somewhat due to geographical region where it is grown, and the strain of rice, silica content of rice hulls is generally in the 13–15% range of dry weight. The silica contained in most biogenic material, such as rice hulls, is substantially all of highly desirable amorphous form, but is bound in a biogenic matrix of many other impurities, particularly long chain hydrocarbons such as lignin and cellulose, but including many inorganic minerals such as calcium, magnesium, etc. and compounds thereof. The invention herein disclosed and claimed concerns itself with a process for separation of the silica from the other impurities found in the biogenic material, primarily the hydrocarbons thereof. Following removal of the hydrocarbons, removal of small quantities of inorganic minerals that remain may be easily substantially removed. The end product is a finely divided white powder of highly pure amorphous silica.

As the preferred material of the inventive process herein disclosed is rice hulls, the description hereinafter following will address that material. It will be understood by those skilled in the art that the inventive concepts herein disclosed and claimed may be applied to other biogenic materials containing economically recoverable quantities of amorphous silica.

A first, but optional step, of the preferred embodiment may be cleaning the rice hulls. Typically this will include screening the hulls to remove stalks, clumps of dirt, leaves and other large bodies therefrom and thereafter washing the hulls, with water, in an aqueous based solution containing a surfactant to enhance wet-ability of the hulls. While no express claim is made in this regard, it is believed that washing the hulls with an aqueous based surfactant solution accelerates absorption of oxidizing solution of a following step, as finely dividing the hulls, by shredding, crushing or other conventional means is also believed to do. Therefore, in the preferred embodiment of the invention, the hulls are screened, washed with a surfactant solution and finely divided to accelerate the process. It is however noted that these steps are non-essential, highly pure amorphous silica may be extracted from rice hulls without employing these steps, although duration of the following steps may be increased.

Following optional cleaning and division of the rice hulls, the preferred embodiment of the invention includes the optional step of soaking them in water, which may be at elevated temperature. While no express claim is made in the following regards, it is believed that soaking the hulls in water, which may be, and preferably is, at elevated temperature, removes various soluble impurities therefrom and increases porosity of the hulls (making them more susceptible to penetration by oxidizing solution in the following step), and may also effect some beneficial changes in the lignin and cellulose contained in the hulls. Whatever the effect of soaking in water, it is observed that soaking rice hulls at near the boiling point of water for 12 or more hours accelerates the subsequent step of reducing the organic materials of the hulls by soaking them in an aqueous based oxidizing solution.

The first essential step of the invention herein disclosed and claimed is reducing the organic materials of the hulls by soaking them in an aqueous based solution containing an oxidizing solute. While any effective oxidizer appears effective in reducing the long chain hydrocarbon compounds of the biogenic material into shorter compounds which are more easily burned, care should be employed in choosing a solute which is economical, relatively safe, easy to use and does not itself contribute chemical residue to the silica which is difficult to remove therefrom. Accordingly many chlorates, perchlorates, nitrates, permanganates and certain peroxide compounds (such as Fenton's reagent) while comprehended by the invention, are not preferred. Peracetic acid is a preferred oxidizing solute because its residue is easily removed in the final, optional, step of the process. However hydrogen peroxide is the most preferred oxidizer because after it is spent water is its only remainder. If the peroxide is not completely spent in processing the hulls, as will typically be the case, so as to ensure full reduction of the organic material of the hulls, the remaining oxygen spontaneously evolves over a short period of time, which evolution may be accelerated by heating, mechanical agitation, electrolytic or various other known means. Accordingly the process disclosed herein is one that is very environmentally friendly.

The initial dosage of hydrogen peroxide (contained in an aqueous solution) of the preferred embodiment of the invention contains approximately 0.1 mole of hydrogen peroxide (about 3.4 grams of peroxide) per kilogram of hulls. It is noted that increasing the temperature of such solution speeds the effect it has on the hulls. Maintaining the temperature of said solution in the 90–100° C. range, over a course of 6–8 hours, has been found fully effective. It will be understood by those skilled in the art that reduction hulls could be further accelerated by increasing the strength or the temperature of the oxidizing solution. Using a temperature in excess of 100° C. will require the use of a pressure vessel. While reduction is possible to at least room temperature or below, it is noted that decreased temperature tends to increase time required for reduction exponentially thus, while comprehended, is not preferred. Initial dosage of hydrogen peroxide may be substantially less, so long as during reduction monitoring is had to insure that at least some non-reacted peroxide remains in solution for a sufficient period of time to accomplish desired reduction of the organic materials of the hulls.

Whatever time, temperature and concentration of hydrogen peroxide may be necessary to accomplish sufficient reduction of the organic material of the hulls in particular cases, that may be facilely determined by placing a small quantity of treated hulls onto a heated (approximately 600° C.) metal plate exposed to air. If the hulls oxidize within seconds to a fine, snow white ash of substantially carbon free silica, then sufficient reduction of the hydrocarbons has taken place. If any carbonaceous residue (which can be seen as black "specks", or may be found by laboratory testing) is detected then additional reduction is required. While no claim is made to the exact manner in which the step of reduction works on any particular constituent of the hulls, it is believed that the oxidant acts as a "chemical scissor", cuffing long chain hydrocarbon molecules, particularly lignin and cellulose, into shorter, more volatile hydrocarbons. Whatever the precise effect, it is noted that without the step of reduction the hulls carbon removal is incomplete, the result of burning the hulls results in an ash containing carbonaceous residue (as noted in U.S. Pat. No. 3,125,043 to Gravel, mentioned above).

Following the above described reducing step the hulls may be thoroughly rinsed with water and are preferably then dried to a water content of 10% or less water content by weight. While this step is not essential, rinsing is believed to remove additional portions of soluble and loose particle impurities which remain in the hulls at this point, and drying makes the subsequently described step of oxidizing the hulls by heat more uniform, excessive steam does not result during that step, etc. Rinsing the hulls, if done, should be done with as pure a water as is practical, such as de-ionized or even distilled water, with very low iron or heavy metal content, lest the rinse water itself contribute undesirable impurities to the silica.

Drying can be done by any conventional means, but drying with heated air is preferred since the process herein disclosed creates a readily available source of heat. In this regard it herein be noted that oxidizing (as will hereinafter be disclosed) the hulls is an exothermic process which generates beneficial amounts of excess heat, which may be used for drying of the hulls, heating of the water the hulls are initially soaked in, heating the oxidizing solution, as described above, and/or for power generation or other purposes. Thus the invention described and claimed herein is also an energy efficient process.

Following the step of reducing the organic materials of the hulls, and preferably rinsing and drying as described above, the hulls are next "burned" (combusted, or oxidized, by heat in the presence of an oxygenated gas). During this step substantially all of the carbon contained in the hulls are driven off from the silica as hot carbon dioxides or monoxides. The preferred temperature range at which the hulls are burned is from about 500–950° C. At temperatures substantially below that range the carbonaceous impurities of the hulls take an excessive length of time to oxidize fully, and at some point may not oxidize at all. At temperatures substantially above that range there is increasing risk that hot spots which will occur due to local exothermic oxidation of impurities, particularly carbonaceous impurities, will begin transforming some of the silica from amorphous to crystalline form, which is not desired. A temperature of 1600° C. should be considered maximum, unless substantial crystallization of silica is tolerable or desired. Generally crystallization will not be preferred, because while the silica crystals will be substantially free of carbonaceous residue, the crystal matrix will typically include non-organic impurities which are difficult to separate from the silica.

In the preferred embodiment of the invention, the hulls are oxidized by elevated temperature, as described above, in the presence of an oxygen containing gas. In order to ensure good oxygenation of all the hulls they are typically placed in a thin bed and air flowed upwardly therethrough. It will be recognized by those skilled in the art that with increased oxygen content of the gas the more rapid will oxidation occur. However, ordinary air, having been found sufficient, it is preferred. Oxidation of the hulls occurs so rapidly in air at approximately 600° C. that by the time the hulls reach temperature set point, oxidation to a fine, white, amorphous silica, without visually detectable carbon residue, is completed.

Due to the fact that silica is stable, quite porous and insoluble in water and acids (except hydrogen fluoride), it can be further washed, rinsed, flushed with wide variety of acids and other solutions designed to remove particular impurities, such as calcium compounds, which remain following oxidation. Again, care must be taken to use pure water and other reagents less they contribute rather than remove impurities from the end product. By properly addressing even trace elements which remain, amorphous silica of nearly any desired degree of purity can be achieved.

It is thus to be appreciated that a process established in accordance with the principles and teachings of the present inventive disclosure constitutes an advancement in field of art to which the invention pertains. While the above description contains many specificities, these should not be construed as limitations on the scope of the invention, but rather as an exemplification of preferred embodiments thereof. Accordingly, the scope of the present invention should be determined not by the embodiments illustrated, but by the appended claims and their legal equivalents.

What is claimed is:

1. A process for production of amorphous silica from biogenic matter, comprising:

soaking said biogenic matter in an aqueous based solution containing an oxidizing solute, wherein the solute is selected from the group consisting of peroxides. chlorates, perchlorates, nitrates and permanganates; and thereafter, oxidizing said biogenic matter by heat in the presence of oxygen.

2. The process of claim 1 wherein the solute is comprised of hydrogen peroxide.

3. The process of claim 1 wherein the aqueous based solution containing an oxidizing solute contains at least 0.1 mole of said solute per kilogram of biogenic matter.

4. The process of claim 1 further comprising the step of elevating the temperature of the aqueous based solution containing an oxidizing solute to a temperature which is sufficient to cause reduction of at least some of the hydrocarbon compounds of said biogenic matter.

5. The process of claim 4 wherein said aqueous based solution is heated to a temperature above 20° C.

6. The process of claim 4 wherein said aqueous based solution is heated to a temperature in the range of 80° C. to 100° C.

7. The process of claim 4 wherein said aqueous based solution is heated to a temperature above 100° C. in a pressure vessel.

8. The process of claim 1 wherein said aqueous based solution is heated to a temperature in the range of 80° C. to 100° C.

9. The process of claim 1 wherein said biogenic matter is oxidized by heat in the presence air.

10. The process of claim 9 wherein said air contains an enhanced amount of oxygen.

11. The process of claim 1 wherein in the step of oxidizing the biogenic matter, the temperature of said biogenic matter is elevated to a temperature above 400° C.

12. The process of claim 11 wherein in the step of oxidizing the biogenic matter, the temperature of said biogenic matter is elevated to a temperature below 1600° C.

13. The process of claim 1 wherein in the step of oxidizing the biogenic matter, the temperature of said biogenic matter is elevated to a temperature in the range of 500° C. to 800° C.

14. The process of claim 1 wherein in the step of oxidizing the biogenic matter, the temperature of said biogenic matter is elevated to a temperature in the range of 500° C. to 950° C.

15. The process of claim 3 wherein in the step of oxidizing the biogenic matter, the temperature of said biogenic matter is elevated to a temperature above 400° C.

16. The process of claim 15 wherein in the step of oxidizing the biogenic matter, the temperature of said biogenic matter is elevated to a temperature below 1600° C.

17. The process of claim 3 wherein in the step of oxidizing the biogenic matter, the temperature of said biogenic matter is elevated to a temperature in the range of 500° C. to 800° C.

18. The process of claim 3 wherein in the step of oxidizing the biogenic matter, the temperature of said biogenic matter is elevated to a temperature in the range of 500° C. to 950° C.

19. The process of claim 4 wherein in the step of oxidizing the biogenic matter, the temperature of said biogenic matter is elevated to a temperature above 400° C.

20. The process of claim 19 wherein in the step of oxidizing the biogenic matter, the temperature of said biogenic matter is elevated to a temperature below 1600° C.

21. The process of claim 4 wherein in the step of oxidizing the biogenic matter, the temperature of said biogenic matter is elevated to a temperature in the range of 500° C. to 800° C.

22. The process of claim 4 wherein in the step of oxidizing the biogenic matter, the temperature of said biogenic matter is elevated to a temperature in the range of 500° C. to 950° C.

23. The process of claim 8 wherein in the step of oxidizing the biogenic matter, the temperature of said biogenic matter is elevated to a temperature in the range of 500° C. to 800° C.

24. The process of claim 8 wherein in the step of oxidizing the biogenic matter, the temperature of said biogenic matter is elevated to a temperature in the range of 500° C. to 950° C.

25. The process of claim 1 wherein the biogenic matter is comprised of rice hulls.

26. The process of claim 25 further comprising the step of pre-soaking the rice hulls in hot water or steam prior to the step of soaking said rice hulls in an aqueous based solution containing an oxidizing solute.

27. The process of claim 26 wherein said rice hulls are soaked for a period of time greater than 12 hours.

* * * * *